Patented Dec. 3, 1935

2,022,884

UNITED STATES PATENT OFFICE 2,022,884

PREPARATION OF VAT DYESTUFFS OF THE DIBENZANTHRONE SERIES

Edward T. Howell, Milwaukee, Wis., assignor to E. I. du Pont de Nemours & Company, Wilmington, Del., a corporation of Delaware No Drawing. Application January 12, 1934, Serial No. 706,405

5 Claims. (Cl. 260—61)

This invention relates to the manufacture of dibenzanthrone compounds by a new and improved method for ring-closing 2,2'-dibenzanthronyl and its substitution derivatives.

While it has been known that 2,2'-dibenzanthronyl can be ring-closed by various methods, each of the known methods presents objectionable features, either in the ring-closure of the 2,2'-dibenzanthronyl or its substitution derivatives. Ring-closure of 2,2'-dibenzanthronyl with caustic alkalies has been found to give the most satisfactory results, but this method cannot be used for ring-closing the halogen substituted 2,2'-dibenzanthronyl, for it splits off halogen. Fusion with aluminum chloride, according to the prior art, gives poor yields and a product lacking in brilliance, while ferric chloride effects a chlorination of the product and is not suitable when an unchlorinated compound is desired. The use of sulfuric acid and oxidizing agents such as manganese dioxide and lead peroxide is also mentioned, but they produce oxydibenzanthrones, while the use of mercuric sulfate and sulfuric acid in ring-closing 2,2'-dibenzanthronyl, according to the processes described in the literature, gives an inferior product, contaminated in some instances with sulfur-containing impurities.

I have now found that if 2,2'-dibenzanthronyls are fused with aluminum chloride in the presence of an oxidizing agent and preferably in the presence of an inert organic or inorganic diluent, a quantitative yield of dibenzanthrone in a high state of purity is obtained. The strength and brightness of dyeings obtained by this method are fully equal to those obtained by the best ring-closing methods, and the process is without the disadvantage of the alkaline type of ring-closing pointed out above. The product is generally free of non-vattable impurities, and the tinctorial yield, based on dyeing strength, is very materially greater than that obtained by aluminum chloride condensations run without the addition of oxidizing agents.

Oxidizing agents such as manganese dioxide or sodium nitrate which ring-close 2,2'-dibenzanthronyl in concentrated sulfuric acid, with the introduction of oxygen or NO₂ groups into the dibenzanthrone molecule, have been found to operate in conjunction with aluminum chloride under the conditions hereafter given without the introduction of oxy or nitro groups.

The proportion of oxidizing agent required may vary within wide limits, but for best results it should not be less than the equivalent of one available oxygen atom per mole of 2,2'-dibenzanthronyl. The oxidizing agent may be added before, with, or after adding the 2,2'-dibenzanthronyl.

Inert diluents, by which term is meant solvents or fluxes such as for instance sodium or potassium chlorides, antimony trichloride or other inorganic salts, ortho-dichlorobenzene or other organic solvents which do not enter into the reaction, or mixtures of such diluents, may be used advantageously.

The temperature at which the reaction proceeds may vary between quite wide limits. At temperatures below 100° C., the velocity of the reaction drops off rapidly, and at higher temperatures, for example 200° C., the reaction proceeds very rapidly, but accompanied by a limited amount of chlorination, which is reduced to a minimum by operating near the lower limit. Without the use of an oxidizing agent with aluminum chloride, temperatures of 140 to 200° are required to bring about complete ring-closure. The effect of the oxidizing agent is most strikingly illustrated when a melt of 2,2'-dibenzanthronyl and sodium-aluminum chloride is heated to about 120° C., at which temperature no reaction takes place until an oxidizing agent is added. On addition of the oxidizing agent, ring-closing sets in immediately and is complete in several minutes. It is an advantage to work at as low a temperature as possible compatible with the time required for complete ring-closing.

The following specific examples are given to explain more fully the invention; it being understood, however, that these examples are merely illustrative and are not to be considered as limiting the invention, for various modifications and alterations may be made in the process without departing from the spirit and scope of the invention as it is covered by the appended claims. Parts given are by weight.

Example 1

10 parts of 2,2'-dibenzanthronyl are added in portions at 125–130° C. to a melt of 10 parts of sodium chloride and 50 parts of anhydrous aluminum chloride. 2.5 parts of finely pulverized sodium nitrate are then added in portions during a period of approximately 1 hour at a temperature which may vary from 120 to 130° C. Stirring is continued at this temperature until dyestuff formation is complete, which may be ascertained when there is no further color change of test samples dissolved in concentrated sulfuric acid. The fusion mass is poured into cold water, filtered, washed with 5% hydrochloric acid solution, and finally with water until acid-free. The dyestuff thus obtained in quantitative yield consists of dibenzanthrone in tinctorial yield materially greater than that obtained with aluminum chloride without the presence of an oxidizing agent.

If the sodium nitrate is added to the above melt as an intimate mixture with the 2,2'-dibenzanthronyl, very similar results are obtained.

Example 2

7.5 parts of 6,6'-dichlor-2,2'-dibenzanthronyl are added at 105–110° C. to a melt of 90 parts of anhydrous aluminum chloride, 9 parts of sodium chloride and 9 parts of potassium chloride. 1.5 parts of potassium nitrate are then added in portions at about 105° C. The temperature is then raised to 150° C. and held until tests indicate no unchanged initial material. The reaction mixture is worked up as in Example 1, giving 6,6'-dichlordibenzanthrone without loss of chlorine. The successful ring-closure of other halogen derivatives may be carried out in similar manner.

Example 3

62.5 parts of pulverized anhydrous aluminum chloride are added to a suspension of 25 parts of 2,2'-dibenzanthronyl in 250 parts of o-dichlorobenzene. After heating the mixture to 120°, 6.25 parts of finely pulverized sodium nitrate are added during a period of approximately 20 minutes at a temperature of 120–140° C., stirring is then continued for one hour at 175–180° C. After cooling, the reaction mixture is worked up by adding to 500 parts of 10% caustic soda solution, followed by steam distillation to remove the solvent. After filtering and extracting with dilute sulfuric acid to remove traces of alumina, the product consists of dibenzanthrone similar in properties to that of Example 1.

Example 4

An intimate mixture of 10 parts of 2,2'-dibenzanthronyl and 2.5 parts of arsenic pentoxide is added at 120–125° C. to a melt of 20 parts of sodium chloride and 100 parts of anhydrous aluminum chloride. During the course of an hour's heating at 120–125° C., an additional 0.5 part of arsenic pentoxide is added and stirring is continued at said temperature until the reaction is complete, which may require a further small amount of arsenic pentoxide. The reaction mixture is then poured into cold water and boiled with the addition of 35 parts of hydrochloric acid 20° Bé., after which it is filtered, washed acid free and dried. The dibenzanthrone thus obtained is similar to that described in Example 1.

Example 5

10 parts of 2,2'-dibenzanthronyl are added at 100° C. to a melt of 9 parts of sodium chloride, 9 parts of potassium chloride and 90 parts of anhydrous aluminum chloride. 6 parts of finely pulverized sodium nitrite are then added, and the temperature gradually raised to 120° C. and held at that point with stirring for about one hour. The temperature is then raised to 140° C. for a few minutes, and the reaction mixture worked up as in Example 1. The dibenzanthrone thus obtained corresponds to that described in Example 1.

Example 6

30 parts of pulverized aluminum chloride are added at 180° C. to 60 parts of antimony trichloride. The temperature, which drops to about 150° C., is held at that point until complete solution is obtained. After cooling to 120° C., there are added 20 parts of 2,2'-dibenzanthronyl and the temperature then raised to 160° C., when 5 parts of finely pulverized sodium nitrate are added during a period of 30 minutes. The reaction mixture is then stirred one hour at 175–180° C. and is worked up by pouring into excess dilute hydrochloric acid solution, boiling, filtering, washing and drying. Dibenzanthrone of increased brightness of shade and dyeing strength is thus obtained, compared with that of the disclosed aluminum chloride condensation of 2,2'-dibenzanthronyl.

Example 7

10 parts of dinitro-2,2'-dibenzanthronyl obtained by the dinitration of 2,2'-dibenzanthronyl in nitrobenzene are added at a temperature of 125–130° C. to a melt of 10 parts of sodium chloride and 50 parts of anhydrous aluminum chloride. 2.5 parts of finely pulverized sodium nitrate are then added in small portions during a period of about one-half hour at the above temperature. Stirring is then continued for one hour at 125–130° C. and then raised to 170° C., whereupon the melt is transferred to 500 parts of water, boiled, filtered, washed with 500 parts of 5% hydrochloric acid solution, and finally with water. The product so obtained consists of a black paste (or powder, if dry) and gives gray dyeings from a dark blue vat.

Example 8

25 parts of sodium chloride (dry) are fused with 125 parts of aluminum chloride. The temperature is adjusted to about 130° C. and 12 parts of Bz2,Bz2'-dichloro-2,2'-dibenzanthronyl are added. 3 parts of sodium nitrate are then added over a 30-minute period. The mass is held at 120–130° for 45 minutes and in the next 15 minutes the temperature is raised to 150°. The mass is drowned in cold water, made slightly acid with HCl, filtered and washed. The product is substantially Bz2,Bz2'-dichloro-dibenzanthrone, having a reddish-violet color in sulfuric acid, and a blue vat with slight red-brown fluorescence from which cotton is dyed bright violet shades.

While the ring-closure of only a few of the substituted 2,2'-dibenzanthronyls has been specifically covered by the specific examples, it is of course understood that other substituted 2,2'-dibenzanthronyls may be ring-closed in the same manner. Other oxidizing agents such as manganese dioxide, cupric oxide, the dichromates and permanganates may be substituted for those specifically mentioned in the examples.

The reaction may be carried out without the use of a solvent or flux, although the presence of one or the other or both is desirable since it leads to a smoother and more easily controlled reaction.

What I claim is:

1. In the process for preparing a dibenzanthrone compound, the step which comprises heating the corresponding 2,2'-dibenzanthronyl compound with aluminum chloride and an oxidizing agent.

2. In the process for preparing a dibenzanthrone compound, the step which comprises heating the corresponding 2,2'-dibenzanthronyl compound in an inert diluent with aluminum chloride and an oxidizing agent.

3. In the process for preparing a dibenzanthrone compound, the step which comprises heating the corresponding 2,2'-dibenzanthronyl compound with aluminum chloride and an oxidizing agent at temperatures between about 100° and 200° C.

4. In the process for preparing a dibenzanthrone compound, the step which comprises heating the corresponding 2,2'-dibenzanthronyl compound in an inert diluent with aluminum chloride and an oxidizing agent at temperatures between 120° and 160° C.

5. In the process for preparing a dihalogendibenzanthrone compound, the step which comprises heating the corresponding dihalogen-2,2'-dibenzanthronyl compound with aluminum chloride and an oxidizing agent at temperatures between about 100 and 200° C.

EDWARD T. HOWELL.